United States Patent
Kececi et al.

(10) Patent No.: US 11,162,730 B2
(45) Date of Patent: Nov. 2, 2021

(54) ELECTRICAL HOUSEHOLD APPLIANCE CABIN WALL ASSEMBLING STRUCTURE WITH INCREASED CONTACT SURFACE

(71) Applicant: ARCELIK ANONIM SIRKETI, Istanbul (TR)

(72) Inventors: Ahmet Kececi, Istanbul (TR); Necat Ozcelik, Istanbul (TR); Salih Pelin, Istanbul (TR); Husamettin Celik, Istanbul (TR); Mustafa Ugras, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 210 days.

(21) Appl. No.: 16/474,511

(22) PCT Filed: Dec. 28, 2016

(86) PCT No.: PCT/EP2016/082736
§ 371 (c)(1),
(2) Date: Jun. 27, 2019

(87) PCT Pub. No.: WO2018/121845
PCT Pub. Date: Jul. 5, 2018

(65) Prior Publication Data
US 2020/0025440 A1   Jan. 23, 2020

(51) Int. Cl.
*F25D 23/06* (2006.01)
(52) U.S. Cl.
CPC ......... *F25D 23/063* (2013.01); *F25D 23/064* (2013.01); *F25D 2201/126* (2013.01)

(58) Field of Classification Search
CPC ................. F25D 23/063; F25D 23/064; F25D 2201/126; Y02B 40/00
USPC .......................................................... 62/447
See application file for complete search history.

(56) References Cited

U.S. PATENT DOCUMENTS

| 997,210 A | 7/1911 | Richardson |
| 5,454,582 A | 10/1995 | Rines |
| 5,972,260 A | 10/1999 | Manni |
| 2006/0201185 A1* | 9/2006 | Takaoka ................. F25D 23/062 62/301 |
| 2014/0015394 A1* | 1/2014 | Cha .......................... F25D 23/04 312/404 |

FOREIGN PATENT DOCUMENTS

| EP | 0434225 A1 | 6/1991 |
| EP | 2649120 A2 | 10/2013 |
| JP | H06221748 A | 8/1994 |

OTHER PUBLICATIONS

International search report and written opinion, dated Sep. 1, 2017, of International Application No. PCT/EP2016/082736; 10 pgs.

* cited by examiner

*Primary Examiner* — Steve S Tanenbaum
(74) *Attorney, Agent, or Firm* — Kilpatrick Townsend & Stockton LLP

(57) ABSTRACT

The present invention relates to an electrical household appliance cabin wall assembling structure with increased contact surface. The present invention more particularly relates to an electrical household appliance comprising a cabinet with a plurality of face walls including a top sheet and a rear sheet defining an interior space of said cabinet.

14 Claims, 5 Drawing Sheets

Figure 1:
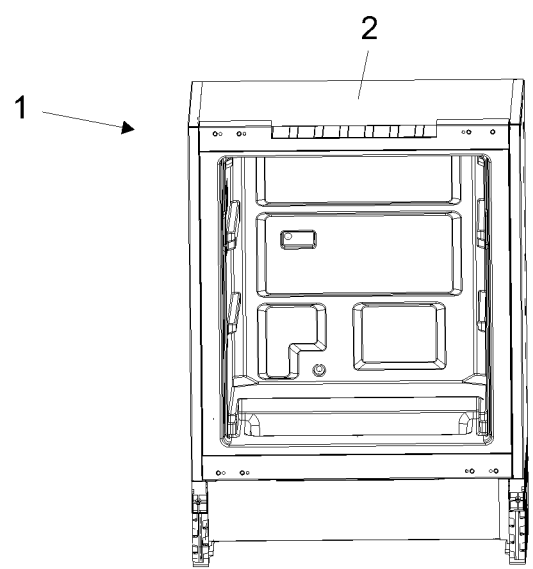

ELECTRICAL HOUSEHOLD APPLIANCE CABIN WALL ASSEMBLING STRUCTURE WITH INCREASED CONTACT SURFACE

RELATED APPLICATIONS

This application is a U.S. National Phase of International Application No. PCT/EP2016/082736, filed Dec. 28, 2016, the entire disclosure of which is incorporated by reference herein.

The present invention relates to an electrical household appliance cabin wall assembling structure with increased contact surface.

Electrical household appliances generally have cabinets with top, bottom, lateral, front and rear side structural elements forming respective surfaces thereof and which can be produced from steel sheet material. Side panels can be assembled to form top, rear and bottom sides of the cabinet.

In the production of refrigerator cabinets, polyurethane is injected into the closed volume surrounded by sheet elements along lateral walls, rear wall and the upper wall and polyurethane thermal insulation material injected into the inner volume inflates and exerts pressure against all the surfaces which surround polyurethane insulation material from inside.

A prior art publication in the technical field of the present invention may be referred to as EP0434225, which discloses a refrigeration appliance having a vacuum insulation system wherein a combination of vacuum thermal insulating panels and polyurethane foam provide the thermal insulating properties as well as structural support. The panels are to be spaced apart from one another with a space between the cabinet and appliance liner so that the foam will lock the panels in place. Also the panels are to be spaced from the corners of the cabinet to permit the foam to flow into the corners. The panels can be applied directly to the cabinet or they can be spaced between the cabinet and liner, held by spacers. In either case, an adhesive is used to hold the liners in position prior to introduction of the foam.

The present invention provides an electrical household appliance in which a structural side member is provided with insulating material communication ports so that polyurethane contact surface is increased and amount of air entrapped within the insulation material is decreased as air discharge is enhanced during polyurethane and vacuum application, as defined by the characterizing features in claim 1.

Primary object of the present invention is to provide an electrical household appliance with improved structural integrity between side panels and structural side members of top and/or rear sheet elements.

The present invention proposes an electrical household appliance and particularly a cooling device with a cabinet having top and rear sheet elements. These sheet elements have integral side members bent inwards and inclined to face side panels to be assembled and with which the cabinet's interior space is covered.

The side member having at least one side member opening ensures that the side panels are fixedly attached with the top and the rear side sheets as the insulation material rigidly connects also adhesively bonded side panels to the inner side surface of said side members.

Accompanying drawings are given solely for the purpose of exemplifying an electrical household appliance with improved structural integrity, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention. The drawings are only exemplary in the sense that they do not necessarily reflect the actual dimensions and relative proportions of the respective components of the system.

FIG. 1 demonstrates a general front view of an electrical household appliance such as a cooling device according to the present invention.

Figure 2:
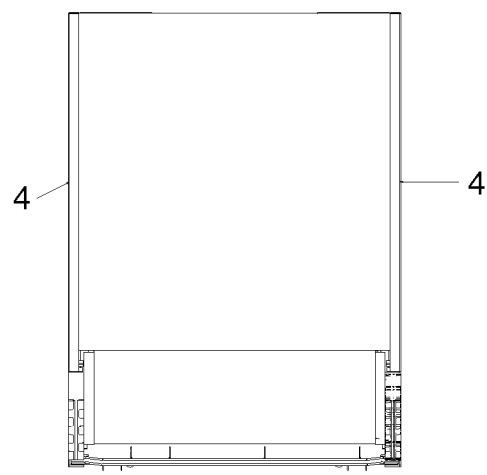

FIG. 2 demonstrates a general rear view of the electrical household appliance according to the present invention.

Figure 3:
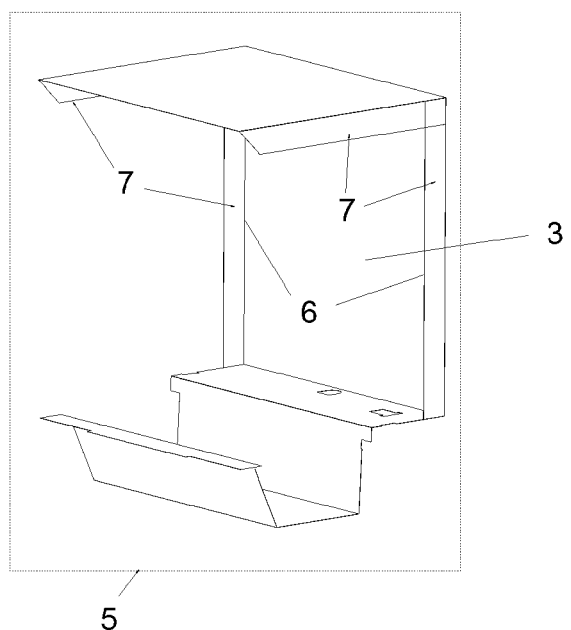

FIG. 3 demonstrates a multi-face structural element according to the present invention.

Figure 4:
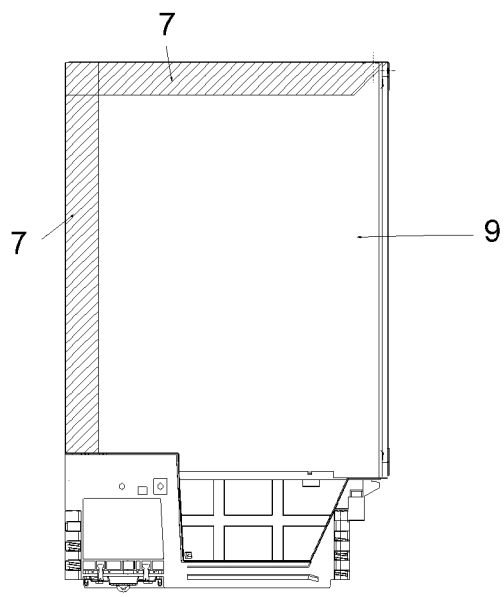

FIG. 4 demonstrates a side view with of the electrical household appliance with side members according to the present invention.

Figure 5:
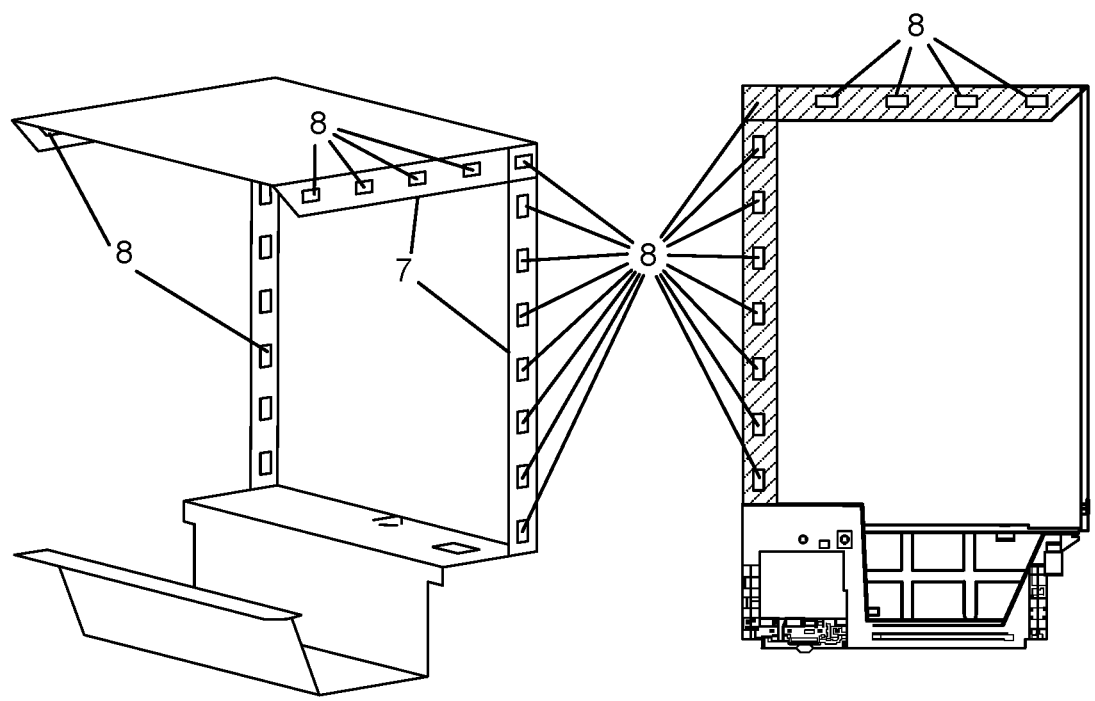
Figure 6:
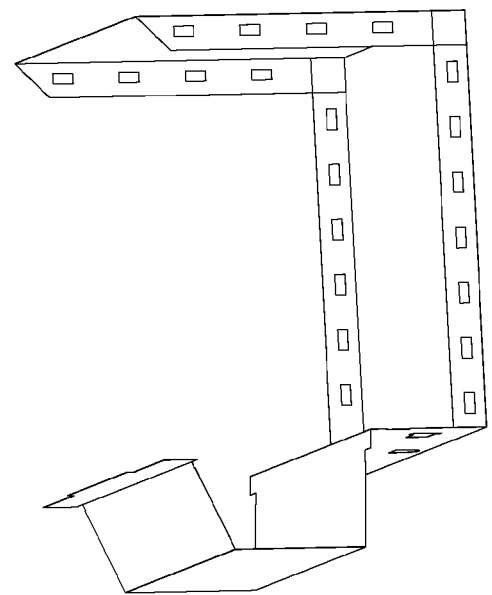
Figure 7:
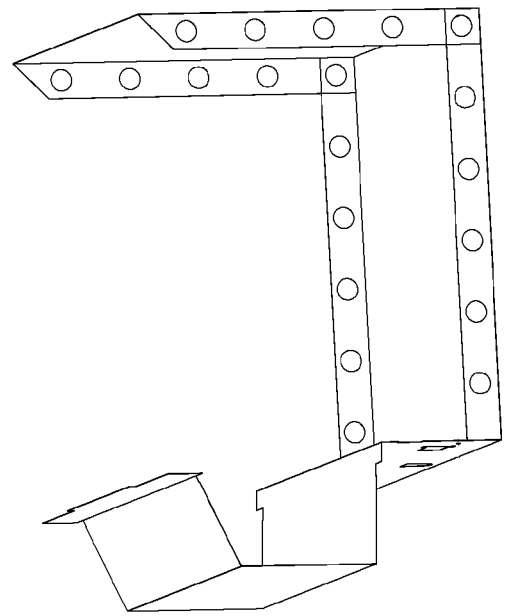
Figure 8:
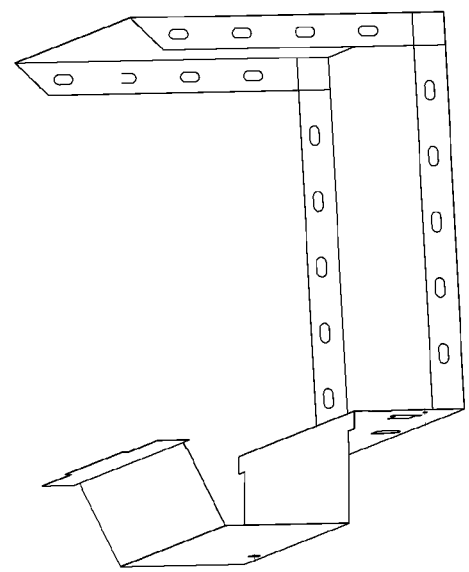
Figure 9:
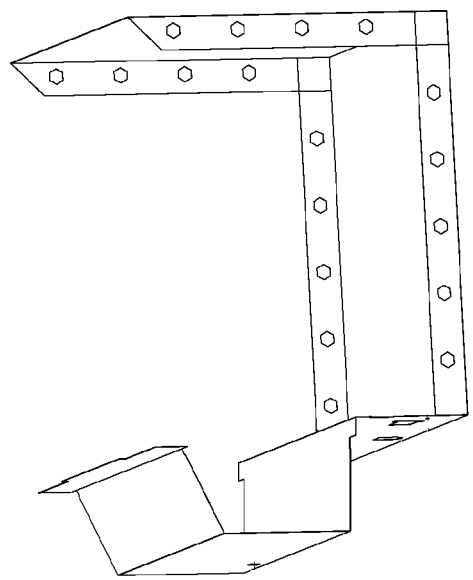

FIG. 5 demonstrates a general perspective view of the multi-face structural element's side members with side member openings according to the present invention.

FIGS. 6 to 9 demonstrate side members with different shape side member openings according to the present invention. Particularly, rectangular, circular, oval and polygonal side member openings are respectively sown in FIG. 6, FIG. 7, FIG. 8 and FIG. 9.

The following numerals are assigned to different parts demonstrated in the drawings:
1) Electrical household appliance
2) Top sheet
3) Rear sheet
4) Side panel
5) Multi-face structural element
6) Lateral edge
7) Side member
8) Side member opening
9) Interior space The present invention relates to an electrical household appliance such as a cooling machine or refrigerator, generally having a six-sided cabinet. A refrigeration appliance typically has an interior refrigeration cabin for storing food items in a refrigerated manner, said interior refrigeration cabin being enclosed by a heat-insulating housing.

Refrigerators generally have cabinets with top, bottom, lateral, front and rear side structural elements (top sheet (2), rear sheet (3)) forming respective surfaces thereof and which can be produced from steel sheet material. Side panels (4) can be assembled with a multi-face structural element (5) shaped to form top, rear and bottom sides of the cabinet, produced by bending the sheet material along predetermined lines.

In the production of refrigerator cabinets, polyurethane is injected into the closed volume surrounded by sheet elements along respective face walls of the cabinet and polyurethane thermal insulation material is injected into the inner volume. Applying vacuum after injection allows the foaming composition to flow and fill the cavity quicker and more efficiently. For example EP 2649120 U.S. Pat. Nos. 5,454, 582 and 5,972,260 disclose techniques for applying vacuum to a mold cavity.

In accordance with the present invention, the electrical household appliance's multi-face structural element (5) is provided with structural side members having insulating material communication ports (side member openings (8)) so that polyurethane contact surface is increased to ensure improved adhesion and connection retaining effect as more contact area of side panels (4) is subject to polyurethane through said side member openings (8), which in turn provides that relative position of the side panel and the side members (7) with respect to each other remains unchanged and adhered to each other. In other words, side panels (4) are kept in contact with said side members (7) and amount of air entrapped within the insulation material is also decreased as air discharge during polyurethane application and applied vacuum is enhanced thanks to said side member openings (8).

In a nutshell, the present invention proposes an electrical household appliance comprising a cabinet with a plurality of face walls including a top sheet (2) and a rear sheet (3) defining an interior space (9) of said cabinet.

In one embodiment of the present invention, each of said top sheet (2) and rear sheet (3) of the cabinet of said electrical household appliance comprises two side members (7) laterally extending in parallel with side panels (4) assembled to laterally cover said interior space (9), said side members (7) extending at least partially along lateral edges (6) of said top sheet (2) and rear sheet (3).

In a further embodiment of the present invention, each side member (7) comprises at least one side member opening (8) providing that at least one interior side surface portion of said side panel (4) remains exposed therethrough.

In a further embodiment of the present invention, insulation material simultaneously covers interior side surface of said side members (7) and interior side surface of said side panels (4) through said side member openings (8).

In a further embodiment of the present invention, insulation material extends from said side member openings (8) to an interior side surface portion of said side panels (4) outside a surface portion of said side panels (4) covered by said side members (7).

In a further embodiment of the present invention, the cabinet of the electrical household appliance comprises a multi-face structural element (5) comprised of said top sheet (2) and said rear sheet (3). The multi-face structural element (5) provides a structural advantage in that the two pairs of side members (7) integral therewith ensures a more robustly assembled product when the insulation material is applied.

In a further embodiment of the present invention, the multi-face structural element (5) is produced from steel sheet material by bending the sheet material to form said top sheet (2) and rear sheet (3).

In a further embodiment of the present invention, said side member openings (8) have rectangular, circular, oval and polygonal shape.

In a further embodiment of the present invention, the electrical household appliance is a refrigerator.

Therefore, the present invention proposes an electrical household appliance with improved structural integrity between side panels (4) and side members (7) while at the same time providing that amount of air entrapped within the insulation material is also decreased thanks to said side member openings (8).

The invention claimed is:

1. An electrical household appliance comprising:
   a cabinet with a plurality of face walls including a top sheet and a rear sheet defining an interior space of said cabinet, wherein:
      each of said top sheet and rear sheet of the cabinet of said electrical household appliance comprises two side members laterally extending in parallel with side panels assembled to laterally cover said interior space,
      said side members extending at least partially along lateral edges of said top sheet and rear sheet, and
      each side member comprises at least one side member opening, wherein when one of the side panels and one of the side members are adhered to each other, at least one interior side surface portion of said side panel remains exposed through the at least one side member opening.

2. The electrical household appliance as in claim 1, wherein said side member openings have rectangular, circular, oval or polygonal shape.

3. The electrical household appliance as in claim 1, wherein the electrical household appliance is a refrigerator.

4. The electrical household appliance as in claim 1, further comprising:
   insulation material that simultaneously covers an interior side surface of said side members and an interior side surface of said side panels through said side member openings.

5. The electrical household appliance as in claim 4, wherein the insulation material extends from said side member openings to an interior side surface portion of said side panels outside a surface portion of said side panels covered by said side members.

6. The electrical household appliance as in claim 4, wherein the cabinet of the electrical household appliance comprises a multi-face structural element comprised of said top sheet and said rear sheet.

7. The electrical household appliance as in claim 6, wherein the multi-face structural element is produced from steel sheet material by bending the sheet material to form said top sheet and rear sheet.

8. An electrical household appliance comprising:
   a cabinet with a plurality of face walls including a top sheet and a rear sheet defining an interior space of the cabinet, wherein:
      each of the top sheet and the rear comprises two side members laterally extending in parallel with side panels assembled to laterally cover the interior space,
      the side members extend at least partially along lateral edges of said top sheet and rear sheet, and
      each side member comprises at least one insulating material communication port that is configured to expose at least one interior side surface portion of the side panel, and to discharge air during application of an insulating material therethrough.

9. The electrical household appliance as in claim 8, wherein said side member openings have rectangular, circular, oval or polygonal shape.

10. The electrical household appliance as in claim 8, wherein the electrical household appliance is a refrigerator.

11. The electrical household appliance as in claim 8, further comprising:
   the insulation material that simultaneously covers an interior side surface of said side members and an interior side surface of said side panels through said side member openings.

12. The electrical household appliance as in claim 11, wherein the insulation material extends from said side member openings to an interior side surface portion of said side panels outside a surface portion of said side panels covered by said side members.

13. The electrical household appliance as in claim 11, wherein the cabinet of the electrical household appliance comprises a multi-face structural element comprised of said top sheet and said rear sheet.

14. The electrical household appliance as in claim 13, wherein the multi-face structural element is produced from steel sheet material by bending the sheet material to form said top sheet and rear sheet.

\* \* \* \* \*